US011494110B2

(12) United States Patent
Wang et al.

(10) Patent No.: US 11,494,110 B2
(45) Date of Patent: Nov. 8, 2022

(54) SCALABLE SEGMENT CLEANING FOR A LOG-STRUCTURED FILE SYSTEM

(71) Applicant: VMware, Inc., Palo Alto, CA (US)

(72) Inventors: Wenguang Wang, Santa Clara, CA (US); Junlong Gao, Mountain View, CA (US); Vamsi Gunturu, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/999,897

(22) Filed: Aug. 21, 2020

(65) Prior Publication Data

US 2022/0057955 A1 Feb. 24, 2022

(51) Int. Cl.
*G06F 3/06* (2006.01)
*G06F 16/17* (2019.01)

(52) U.S. Cl.
CPC .......... *G06F 3/0652* (2013.01); *G06F 3/0604* (2013.01); *G06F 3/0665* (2013.01); *G06F 3/0673* (2013.01); *G06F 16/1734* (2019.01)

(58) Field of Classification Search
CPC .... G06F 3/0652; G06F 3/0604; G06F 3/0665; G06F 3/0673; G06F 16/1734
See application file for complete search history.

(56) References Cited

U.S. PATENT DOCUMENTS

2002/0046328 A1* 4/2002 Okada ...................... H04N 5/76 710/33
2006/0262915 A1* 11/2006 Marascio ........... H04Q 11/0414 379/201.01
2007/0162720 A1* 7/2007 Branda ................. G06F 9/5077 711/173
2013/0091186 A1* 4/2013 Stephens ............. G06F 12/0253 707/813
2015/0006843 A1* 1/2015 Moser ................... G06F 12/023 711/170
2016/0313922 A1* 10/2016 Kojima ................. G06F 3/0688
2017/0160953 A1* 6/2017 Hirata ................... G06F 3/0679
2018/0113805 A1* 4/2018 Horie ..................... G06F 16/188
2018/0307417 A1* 10/2018 Dubeyko .............. G06F 3/0674
2019/0018742 A1* 1/2019 Thomsen ............ G06F 11/1471
2020/0250083 A1* 8/2020 Shilane ................. G06F 3/0608

* cited by examiner

*Primary Examiner* — Arpan P. Savla
*Assistant Examiner* — Eric T Loonan

(57) ABSTRACT

Scalable segment cleaning for log-structured file systems (LFSs) includes determining counts of segment cleaners and virtual nodes, with each virtual node being associated with a plurality of objects. Each virtual node is assigned to a selected segment cleaner. Based at least on the assignments, performing, for each virtual node, segment cleaning of the objects by the assigned segment cleaner. A portion, less than all, of the virtual nodes are reassigned to a newly selected segment cleaner based on a change of the count of the segment cleaners and/or a change of the count of the virtual nodes. Based at least on the reassignments, segment cleaning of the objects is performed, for each reassigned virtual node, by the reassigned segment cleaner. In some examples, the objects comprise virtual machine disks (VMDKs) and the segment cleaning uses a segment usage table (SUT) to track segment usage and identify segment cleaning candidates.

20 Claims, 9 Drawing Sheets

SCALABLE SEGMENT CLEANING FOR A LOG-STRUCTURED FILE SYSTEM

BACKGROUND

Storage of large amounts of data, for example for backups and disaster recovery of large-scale systems, benefits from solutions that are based on a trade-off of access time, resource utilization, and financial costs. In some scenarios, a log-structured file system (LFS) provides desirable properties. An LFS uses segment cleaning to reclaim storage space, moving remnants of partially-deleted data from multiple lightly-used contiguous sections (e.g., log segments) into a smaller set of more heavily-used segments. This provides the opportunity to write new data as entire segments, which reduces the negative impact of a phenomenon known as write amplification—an expansion of the input/output (I/O) transactions that are caused, at least in part, by error control measures. When an LFS is implemented on a large scale, however, it is difficult to preserve segment cleaning efficiencies with existing systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide scalable segment cleaning for log-structured file systems (LFSs) include determining counts of segment cleaners and virtual nodes, each virtual node associated with a plurality of objects; assigning each virtual node to a selected segment cleaner; based at least on the assignments, performing, for each virtual node, segment cleaning of the objects by its assigned segment cleaner; reassigning a portion, less than all, of the virtual nodes to a newly selected segment cleaner, based at least on a change of the count of the segment cleaners and/or a change of the count of the virtual nodes; and based at least on the reassignments, performing, for each reassigned virtual node, segment cleaning of the objects by its reassigned segment cleaner.

BRIEF DESCRIPTION OF THE DRAWINGS

The present description will be better understood from the following detailed description read in the light of the accompanying drawings, wherein.

DETAILED DESCRIPTION

Aspects of the disclosure provide scalable segment cleaning for log-structured file systems (LFSs) to keep up with operational demands while preserving efficiencies. Counts of segment cleaners and virtual nodes are determined. Each virtual node is associated with a plurality of objects, such as virtual machine disks (VMDKs). Each virtual node is assigned to a selected segment cleaner. Based at least on the assignments, segment cleaning of the objects is performed, for each virtual node, by its assigned segment cleaner. A change of the count of the segment cleaners and/or a change of the count of the virtual nodes may occur. Based on this change and/or other changes, a portion, less than all, of the virtual nodes are reassigned to a newly selected segment cleaner. Based at least on the reassignments, segment cleaning of the objects is performed, for each reassigned virtual node, by its reassigned segment cleaner. In some examples, the segment cleaning uses a segment usage table (SUT) to track segment usage and identify segment cleaning candidates.

Aspects of the disclosure operate in an unconventional manner at least by reassigning, for a portion (less than all) of the plurality of virtual nodes, each virtual node of the portion to a newly selected segment cleaner, based at least on a change of a count of segment cleaners and/or a count of virtual nodes. Aspects of the disclosure improve the speed, efficiency, and cost of computer storage (e.g., speeding data writing and/or reading) by assigning each virtual node to a selected segment cleaner and performing, for each virtual node, segment cleaning of the plurality of objects by its assigned segment cleaner. Aspects of the disclosure shard the workspace, for example by embedding an object identifier into a chunk identifier, and then apportion the segment cleaning workload using a fast load balancing approach. Advantageous teachings of the disclosure may be applied in environments in which the workspace may be sharded and load balancing of operations is beneficial.

Figure 1:
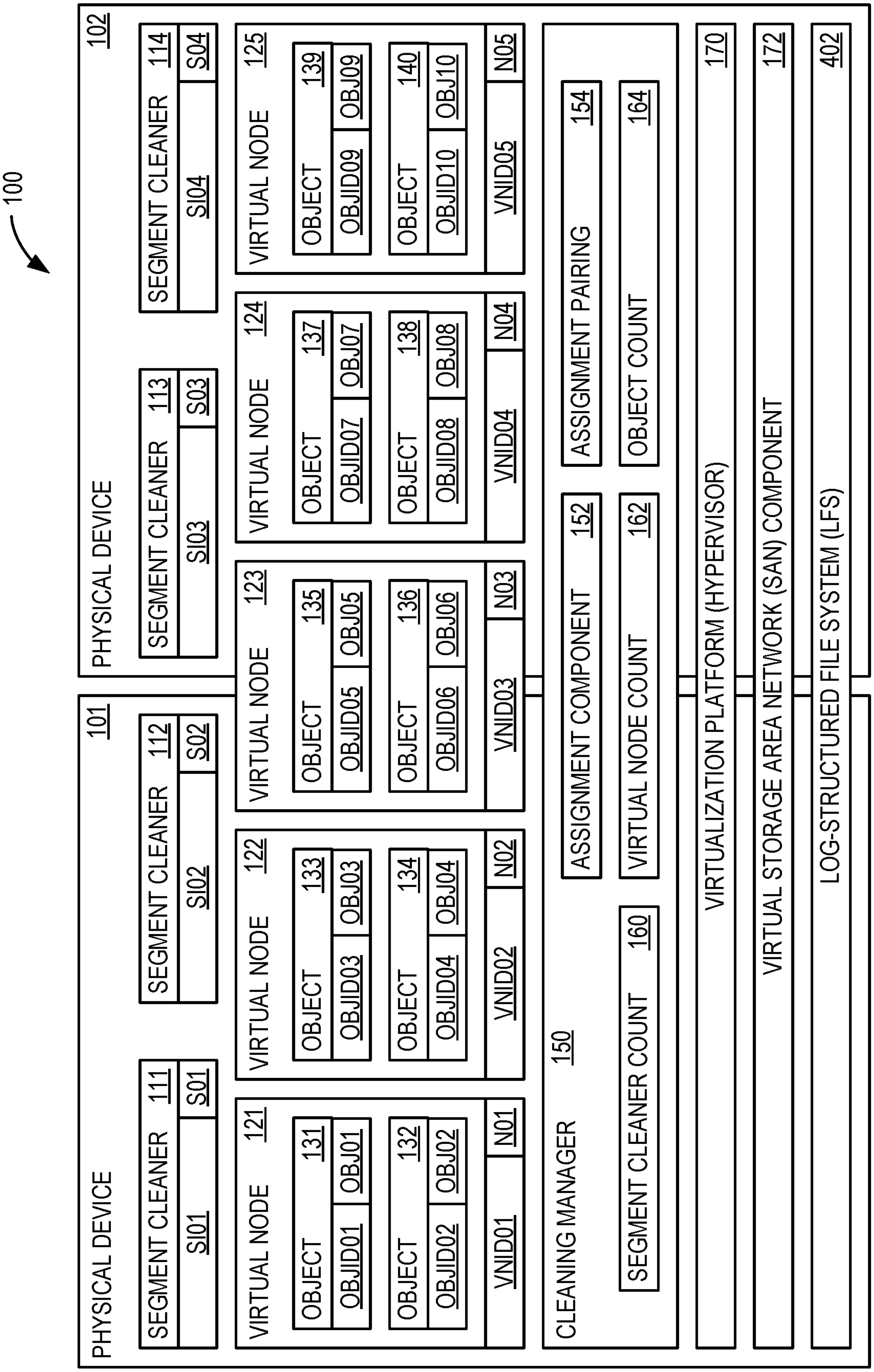
FIG. 1 illustrates an architecture that may advantageously scale segment cleaning for a log-structured file system (LFS)

FIG. 1 illustrates an architecture 100 that may advantageously scale segment cleaning for an LFS. A plurality of physical devices, represented as physical device 101 and physical device 102, provide the underlying hardware for a virtualized arrangement, such as a software defined data center (SDDC). A virtualization platform 170, which includes hypervisor functionality, manages objects 131-140. In some examples, objects 131-140 represent VMDKs, for example snapshots of VMDKs. In some examples, objects 131-140 are snapshots of versioned object data, for example VMDK snapshots. In some examples, each snapshot is a version of a versioned object.

A virtual storage area network (SAN) component 172 permits use of separate physical storage devices (e.g., physical devices 101 and 102 or some other set of physical devices) to be treated as a single storage solution. Virtual SAN component 172 reads to and writes from an LFS 402, which is a component of a tiered storage structure 400 (a tiered data storage structure). LFS 402 and tiered storage structure 400 are described in greater detail in relation to FIG. 4. As illustrated, virtualization platform 170, virtual SAN component 172, and LFS span multiple physical devices 101-102.

Objects 131-140 are associated with various ones of virtual nodes 121-125. Object 131 has an object identifier OBJID01 and an object assignment identifier OBJ01. Object identifier OBJID01 is a name of object 131, and object assignment identifier OBJ01 is used for associating object 131 with a virtual node 121 (e.g., assigning object 131 to virtual node 121). In some examples, object identifiers (e.g., OBJID01-OBJID10) comprises a 48-bit identifier. In some examples, object identifier OBJID01 and object assignment identifier OBJ01 are the same identifier. In some examples, object identifier OBJID01 or object assignment identifier OBJ01 is assigned randomly or by a defined process. In some examples, object assignment identifier OBJ01 is derived by performing a process on object identifier OBJID01, for example calculating a hash value of object identifier OBJID01 and/or performing a modulus operation. The other object identifiers OBJID02-OBJID10 and object assignment identifiers OBJ02-OBJ10 may be related and generated similarly.

Object 132 has an object identifier OBJID02 and an object assignment identifier OBJ02, and is also associated with virtual node 121. Object 133 has an object identifier OBJID03 and an object assignment identifier OBJ03, and is associated with a virtual node 122. Object 134 has an object identifier OBJID04 and an object assignment identifier OBJ04, and is also associated with virtual node 122. Object 135 has an object identifier OBJID05 and an object assignment identifier OBJ05, and is associated with a virtual node 123. Object 136 has an object identifier OBJID06 and an object assignment identifier OBJ06, and is also associated with virtual node 123. Object 137 has an object identifier OBJID07 and an object assignment identifier OBJ07, and is associated with a virtual node 124. Object 138 has an object identifier OBJID08 and an object assignment identifier OBJ08, and is also associated with virtual node 124. Object 139 has an object identifier OBJID09 and an object assignment identifier OBJ09, and is associated with a virtual node 125. Object 140 has an object identifier OBJID10 and an object assignment identifier OBJ10, and is also associated with virtual node 125.

Virtual node 121 has a virtual node identifier VNID01 and a virtual node assignment identifier N01. Virtual node identifier VNID01 is a name of virtual node 121, and virtual node assignment identifier N01 is used for associating virtual node 121 with one of segment cleaners 111-114. In some examples, virtual node identifier VNID01 and virtual node assignment identifier N01 are the same identifier. In some examples, virtual node identifier VNID01 or virtual node assignment identifier N01 is assigned randomly or by a defined process. In some examples, virtual node assignment identifier N01 is derived by performing a process on virtual node identifier VNID01, for example calculating a hash value of virtual node identifier VNIDO1 and/or performing a modulus operation. The other virtual node identifiers VNID02-VNID05 and virtual node assignment identifiers N02-N05 may be related and generated similarly.

Virtual node 122 has a virtual node identifier VNID02 and a virtual node assignment identifier N02. Virtual node 123 has a virtual node identifier VNID03 and a virtual node assignment identifier N03. Virtual node 124 has a virtual node identifier VNID04 and a virtual node assignment identifier N04. Virtual node 125 has a virtual node identifier VNIDO5 and a virtual node assignment identifier N05. Thus, arrangement 100 has a plurality of virtual nodes 121-125, wherein each virtual node 121-125 is associated with a plurality of objects (e.g., objects 131 and 132, objects 133 and 134, objects 135 and 136, objects 137 and 138, and objects 139 and 140).

Segment cleaner 111 has a segment cleaner identifier SIDO1 and a segment cleaner assignment identifier S01. Segment cleaner identifier SIDO1 is a name of segment cleaner 111, and segment cleaner assignment identifier S01 is used for associating segment cleaner 111 with one of virtual nodes 121-125. In some examples, segment cleaner identifier SIDO1 and segment cleaner assignment identifier S01 are the same identifier. In some examples, segment cleaner identifier SID01 or segment cleaner assignment identifier S01 is assigned randomly or by a defined process. In some examples, segment cleaner assignment identifier S01 is derived by performing a process on segment cleaner identifier SID01, for example calculating a hash value of segment cleaner identifier SID01 and/or performing a modulus operation. The other segment cleaner identifiers SID02-SID04 and segment cleaner assignment identifiers S02-S04 may be related and generated similarly.

Segment cleaner 112 has a segment cleaner identifier SID02 and a segment cleaner assignment identifier S02. Segment cleaner 113 has a segment cleaner identifier SID03 and a segment cleaner assignment identifier S03. Segment cleaner 114 has a segment cleaner identifier SID04 and a segment cleaner assignment identifier S04. Although four segment cleaners 111-114, five virtual nodes 121-125, and ten objects 131-140 are illustrated, in some examples, the numbers may be closer to tens of segment cleaners, hundreds of virtual nodes, and thousands or even millions of objects. That is, in some examples, a count of the virtual nodes exceeds a count of the segment cleaners by at least an order of magnitude, and a count of the objects exceeds the count of the virtual nodes by at least an order of magnitude.

A cleaning manager 150 manages the segment cleaning operations of segment cleaners 111-114, scaling the segment cleaning operations of LFS 402 as needed. For example, cleaning manager 150 determines the count of the operating ones of segment cleaners 111-114, storing the count as segment cleaner count 160, monitors the workload of segment cleaners 111-114 to determine whether one or more of segment cleaners 111-114 is overloaded, and spawns a new segment cleaner when necessary to maintain proper segment cleaning operations. Cleaning manager 150 also determines the count of virtual nodes 121-125, storing the count as virtual node count 162, and determines the count of objects 131-140, storing the count as object count 164.

An assignment component 152 assigns each of virtual nodes 121-125 to a selected one of segment cleaners 111-114, and stores the assignments and reassignments in an assignment pairing 154. In some examples, assignment pairing 154 comprises a key-value store. Cleaning manager 150 tasks segment cleaners 111-114 according to the assignments in assignment pairing 154, or segment cleaners 111-114 read assignment pairing 154 to determine the assignments. Assignment and reassignment processes performed in a manner to balance loads among segment cleaners 111-114, as described below.

Figure 2A:
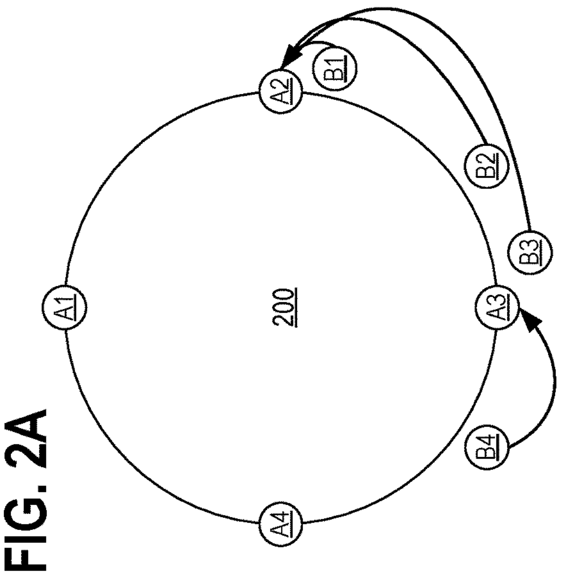
FIGS. 2A-2D illustrate load balancing using consistent hashing, as may be used with the architecture of FIG. 1.

FIGS. 2A-2D illustrates load balancing of the disclosure using consistent hashing, as may be used with architecture 100. While these figures are described with reference to consistent hashing, aspects of the disclosure are operable with other forms of load balancing. FIGS. 2A-2D provides for a generic explanation, and specific examples are described in relation to FIG. 3. FIG. 2A illustrates a scenario in which four assets A1, A2, A3, and A4, are available for tasking, and four computational burdens, B1, B2, B3, and B4, are to be assigned to the four assets A1-A4. Ideally, computational burdens B1-B4 will be assigned to assets A1-A4 in a manner that the loads on assets A1-A4 are balanced. FIG. 2A depicts assets A1-A4 and computational burdens B1-B4 as arranged in a circle 200, which is a notional display for a wrapping condition, as may occur with a modulus operation. For example, with a modulus 10 operation, any number maps to the interval [through 9]. The positions on circle 200 correspond to an assignment identifier value. In the illustrated examples, a given one of computational burdens B1-B4 will be assigned to whichever one of assets A1-A4 is represented on circle 200, immediately counter-clockwise.

Figure 2B:
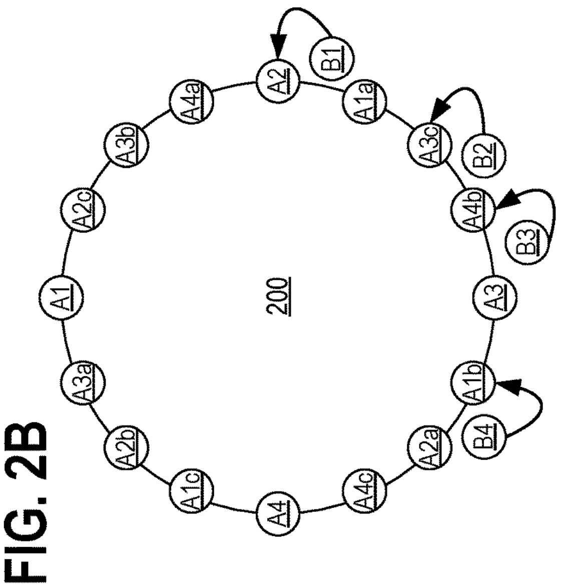

In the illustrated scenario of FIG. 2A, computational burdens B1, B2, and B3 are all assigned to asset A2, computational burden B4 is assigned to asset A3, and assets A1 and A4 have no assigned computational burdens. This assignment arrangement overly burdens asset A2, even while assets A1 and A4 remain under-utilized. In FIG. 2B, each of assets A1-A4 is represented by additional assignment points. Asset A1 has additional assignment points A1*a*, A1*b*, and A1*c*, providing asset A1 additional representations for receiving an assignment of one of computational burdens B1-B4. Similarly, asset A2 has additional assignment points A2*a*, A2*b*, and A2*c*; asset A3 has additional assignment points A3*a*, A3*b*, and A3*c*; and asset A4 has additional assignment points A4*a*, A4*b*, and A4*c*. Now, as shown in FIG. 2B, computational burden B1 is assigned to asset A2, computational burden B2 is assigned to asset A3, computational burden B3 is assigned to asset A4, and computational burden B4 is assigned to asset A1. This represents a better load-balanced condition.

Figure 2C:
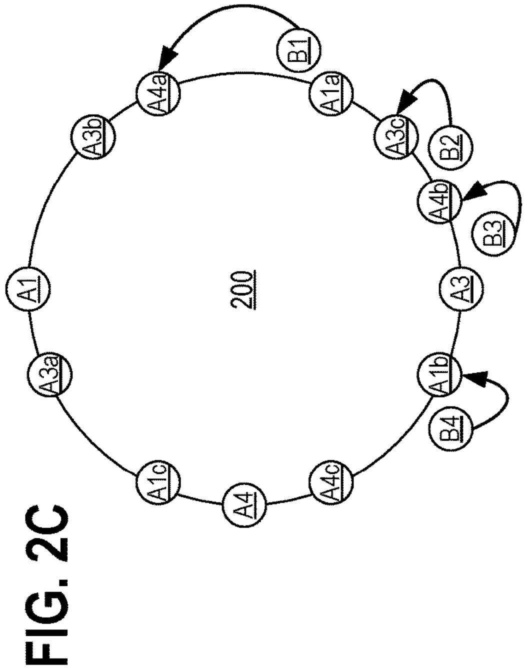
Figure 2D:
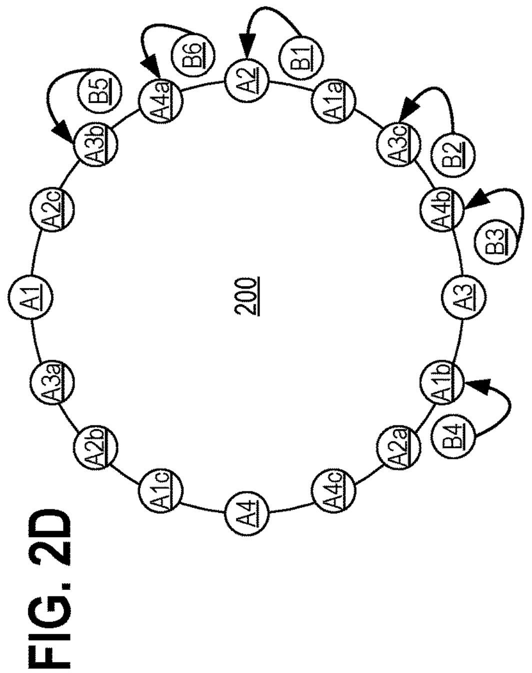

If asset A2 ceases operations, asset A2 and its additional assignment points A2*a*-A2*c* disappear from the circle, and computational burden B1 is reassigned to asset A4. This is illustrated in FIG. 2C. Now, assets A1 and A4 each have a single computational burden and asset A4 has two. In another reassignment scenario, illustrated in FIG. 2D, all four assets A1-A4 are operating, but two new computational burdens B5 and B6 are introduced. Despite both being between assets A1 and A2 on circle 200, due to the additional assignment points, computational burdens B5 and B6 are more evenly distributed. Computational burden B5 is assigned to asset A3 and computational burden B6 is assigned to asset A4. In this scenario, Assets A1 and A2 each have a single computational burden and assets A3 and A4 each have two.

Figure 3:
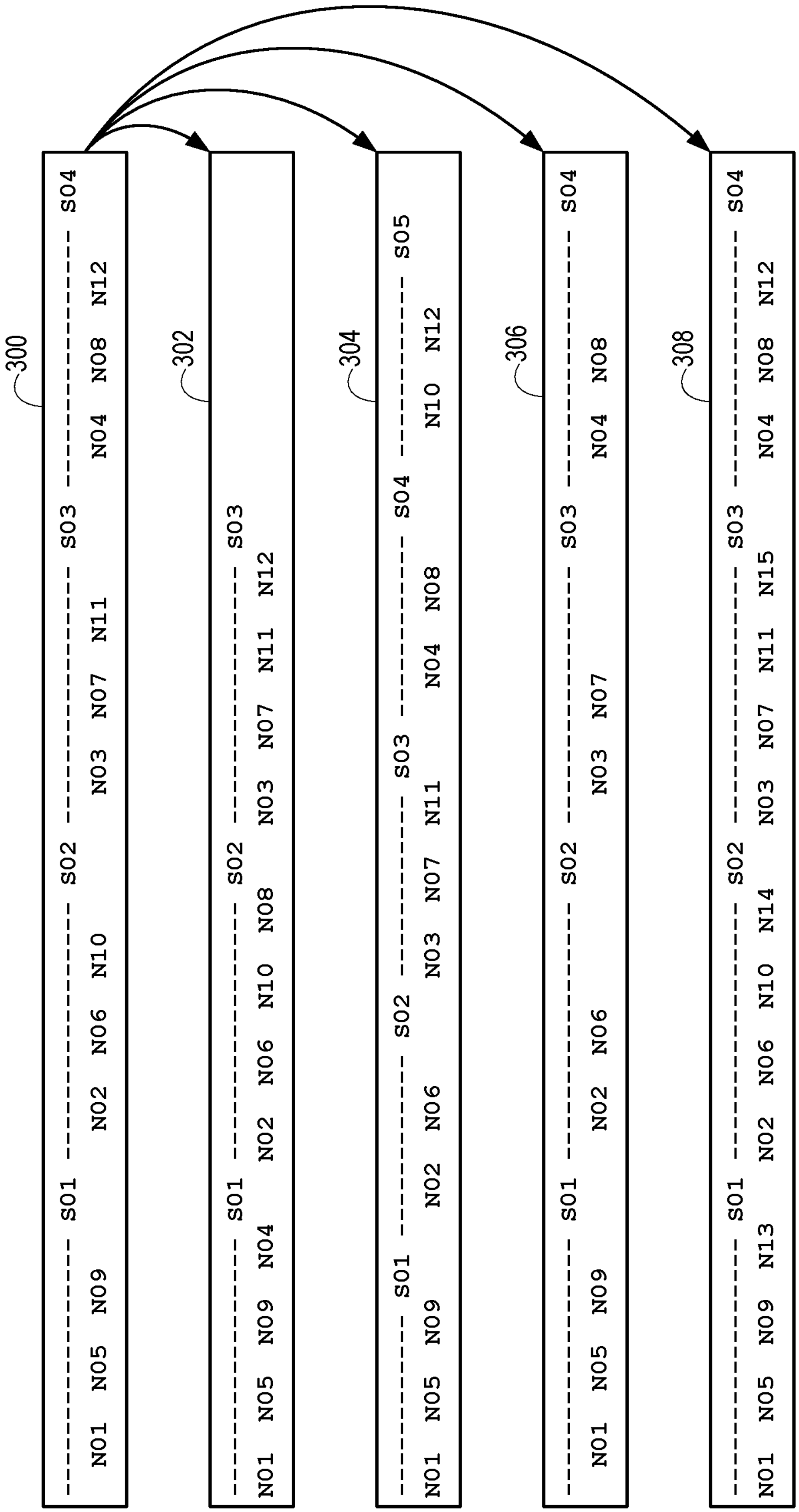
FIG. 3 illustrates graphically a notional initial assignment of virtual nodes to segment cleaners, and four reassignment conditions, as may occur with the architecture of FIG. 1.

FIG. 3 illustrates graphically a notional initial assignment of virtual nodes to segment cleaners, and four reassignment conditions, as may occur with architecture 100. In relation to FIGS. 2A-2D, segment cleaners correspond to the assets and virtual nodes correspond to the computational burdens. It should be noted that the assignment direction (clockwise or counter-clockwise) may be reversed without changing the principle of operation. For architecture 100, assignments and reassignments are stored in assignment pairing 154 of FIG. 1. As used herein, reassignment means an assignment after an initial assignment process, including when newly-introduced objects and segment cleaners are being assigned for the first time.

In initial assignment condition 300, there are four segment cleaners represented by segment cleaner assignment identifiers S01-S04 and twelve virtual nodes represented by virtual node assignment identifiers N01-N12. As illustrated, the load is balanced, with each of segment cleaner assignment identifiers S01-S04 mapped to three virtual nodes. Each virtual node assignment identifier is mapped to the next segment cleaner assignment identifier which it does not exceed, in a notional sorting going from left to right. S01 has N01, N05, and N09. S02 has N02, N06, and N10. S03 has N03, N07, and N11. S04 has N04, N08, and N12. FIG. 3 illustrates four separate reassignment conditions: (1) decreasing the count of segment cleaners, (2) increasing the count of segment cleaners, (3) decreasing the count of virtual nodes, and (4) increasing the count of virtual nodes.

In reassignment condition 302, the segment cleaner with segment cleaner assignment identifier S04 has ceased operation, thereby decreasing the count of segment cleaners from four to three. Rather than performing a reassignment of all virtual nodes, only the portion initially mapped to segment cleaner assignment identifier S04 (e.g., virtual nodes represented by virtual node assignment identifiers N04, N08 and N12) is reassigned. Using the technique of consistent hashing, S01 receives N04, S02 receives N08, and S03 receives N12, maintaining load balancing.

In reassignment condition 304, a new segment cleaner with segment cleaner assignment identifier S05 has been spawned, thereby increasing the count of segment cleaners from four to five. Rather than performing a reassignment of all virtual nodes, only a portion of the virtual nodes is reassigned. Using the technique of consistent hashing, S05 receives N10 from S02 and receives N12 from S04. Thus, S01 and S03 each have three, and S02, S04 and S05 each have two. This maintains load balancing, within the relatively small numbers used in the illustration of FIG. 3. In an operational system, with larger numbers of segment cleaners and virtual nodes, the load balancing may be such that each segment cleaner has a relative load that approximates a ratio defined by a final count of the virtual nodes divided by a final count of the segment cleaners, with approximating the ratio being within ten percent of the calculated value, in many scenarios. That is, after either the number of virtual nodes has changed (from an initial count to a final count) and/or the number of operating segment cleaners has changed (from an initial count to a final count), each segment cleaner will service approximately the same number of virtual nodes.

In reassignment condition 306, the virtual nodes represented by virtual node assignment identifiers N10-N12 have ceased operation, thereby decreasing the count of virtual nodes from twelve to ten. Rather than performing a reassignment of all virtual nodes, only the portion of virtual nodes that have ceased operation are affected. In reassignment condition 308, three new virtual nodes represented by virtual node assignment identifiers N13-N15 have begun operation, thereby increasing the count of virtual nodes from twelve to fifteen. Rather than performing a reassignment of all virtual nodes, only the new portion of virtual nodes is reassigned (assigned after an initial assignment process). Using the technique of consistent hashing, S01 receives N13, S02 receives N14, and S03 receives N15, maintaining load balancing.

Figure 4:
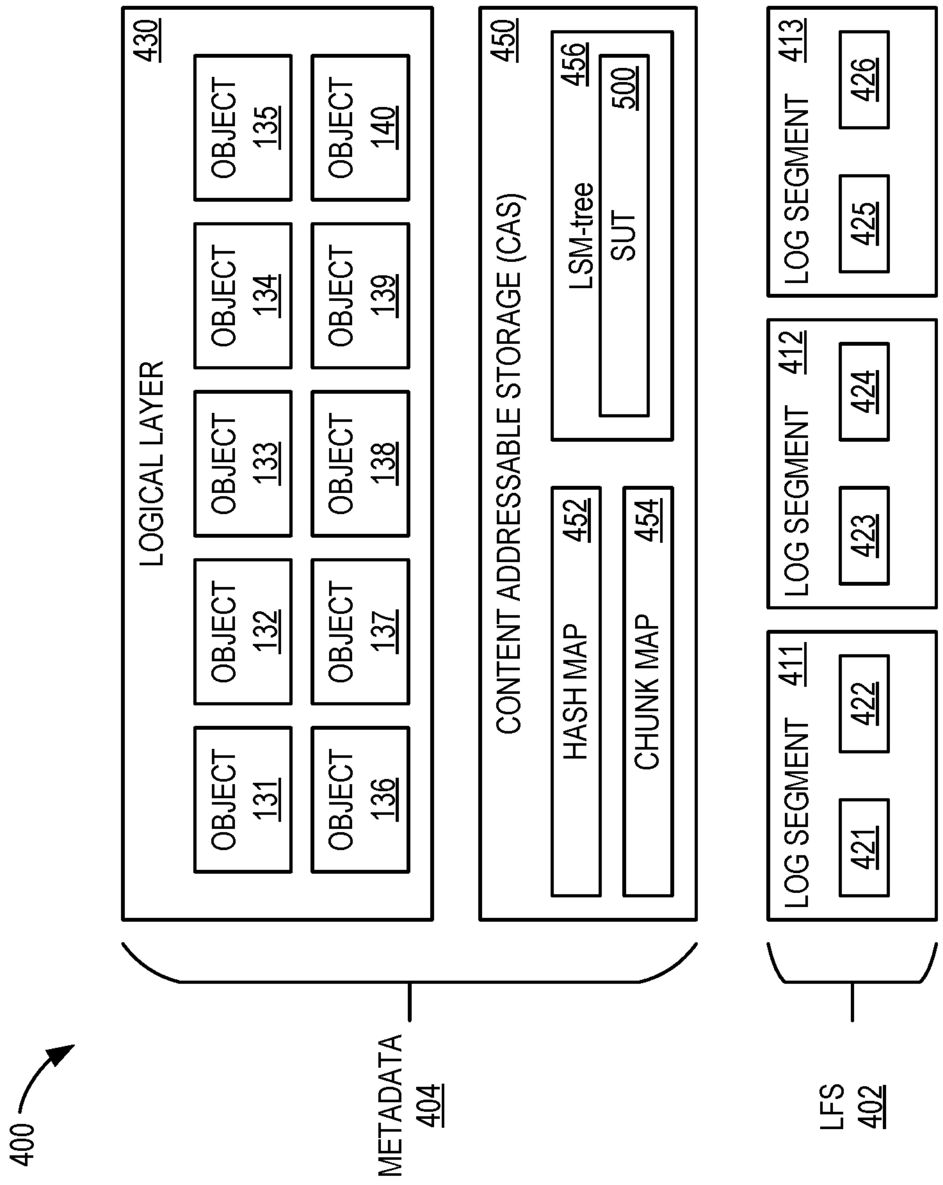
FIG. 4 illustrates a tiered data storage structure that may be used in the architecture of FIG. 1.

FIG. 4 illustrates tiered storage structure 400 that may be used in architecture 100. Tiered storage structure 400 has LFS 402 and a metadata tier 404. LFS 402 includes multiple log segments 411-413 that actually store the bulk data as chunks. For example, log segment 411 has chunk 421 and chunk 422; log segment 412 has chunk 423 and chunk 424; and log segment 413 has chunk 425 and chunk 426. In some examples, log segments 411-413 are approximately 4 megabytes (MB), for example 4 MB of data followed by metadata describing the data contents. It should be understood that the illustration of only three log segments and eight chunks is notional and a much larger number of chunks may be used. Metadata tier 404 has a top logical layer 430 that represents objects, such as objects 131-140, and a content addressable storage (CAS) 450 that assists mapping contents of logical layer 430 to LFS 402. CAS 450 holds a hash map 452, a chunk map 454, and SUT 500 in a log-structured merge-tree (LSM-tree) 456 stored as key-value pairs. In some examples, hash map 452, and chunk map 454 are also stored in an LSM-tree.

LSM-tree 456 comprises a write-optimized data structure that maintains multiple levels of larger sorted tables, for example 300 Mb, 3 GB, 30 GB, and 300 GB as an exponential four-level LSM-tree. LSM-tree 456 may be structured to minimize write amplification for random updates, and each level may be a log.

CAS 450 sitting between logical layer 430 and LFS 402 (a data tier) serves multiple purposes simultaneously. This arrangement permits deduplication operations to locate data by content, and adds a level of indirection to allow LFS 402 to move data efficiently during segment cleaning. A hash function (e.g., secure hash algorithm 256 (SHA-256)) may be used as the content hash so that any blocks with identical hash values stored in hash map 452 may be identified as duplicates. This also enables CAS 450 to locate any block in LFS 402 when provided its hash value, facilitating data deduplication. Data deduplication may be performed inline and/or offline. Inline deduplication performs deduplication on the write path directly so that less data is written initially, thereby implementing network acceleration.

Because hash values are randomly distributed, CAS 450 also includes chunk map 454 to improve caching. Chunk map 454 maps chunk identifiers to the chunks' locations in LFS 402. In some examples, chunk identifiers in chunk map 454 are sequentially allocated for locality. In some examples, a chunk identifier may be 8 bytes. In some examples, an object identifier (e.g., OBJID01 of FIG. 1) is embedded into the chunk identifier, which shards the chunk identifier address space by the object identifier. In some examples, each chunk is 4 kilobytes (KB) so that block differences are 4 KB aligned. A chunk (or an array of chunks) is a deduplication unit, allowing multiple objects to point to common chunks to save space.

Figure 5A:
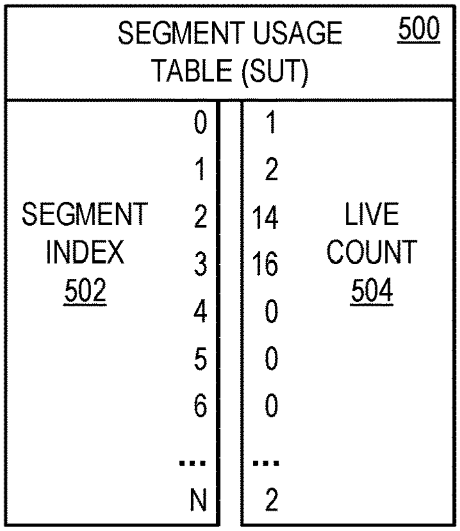
FIGS. 5A and 5B illustrate optional configurations for a segment usage table (SUT) that may be used in the architecture of FIG. 1.
Figure 5B:
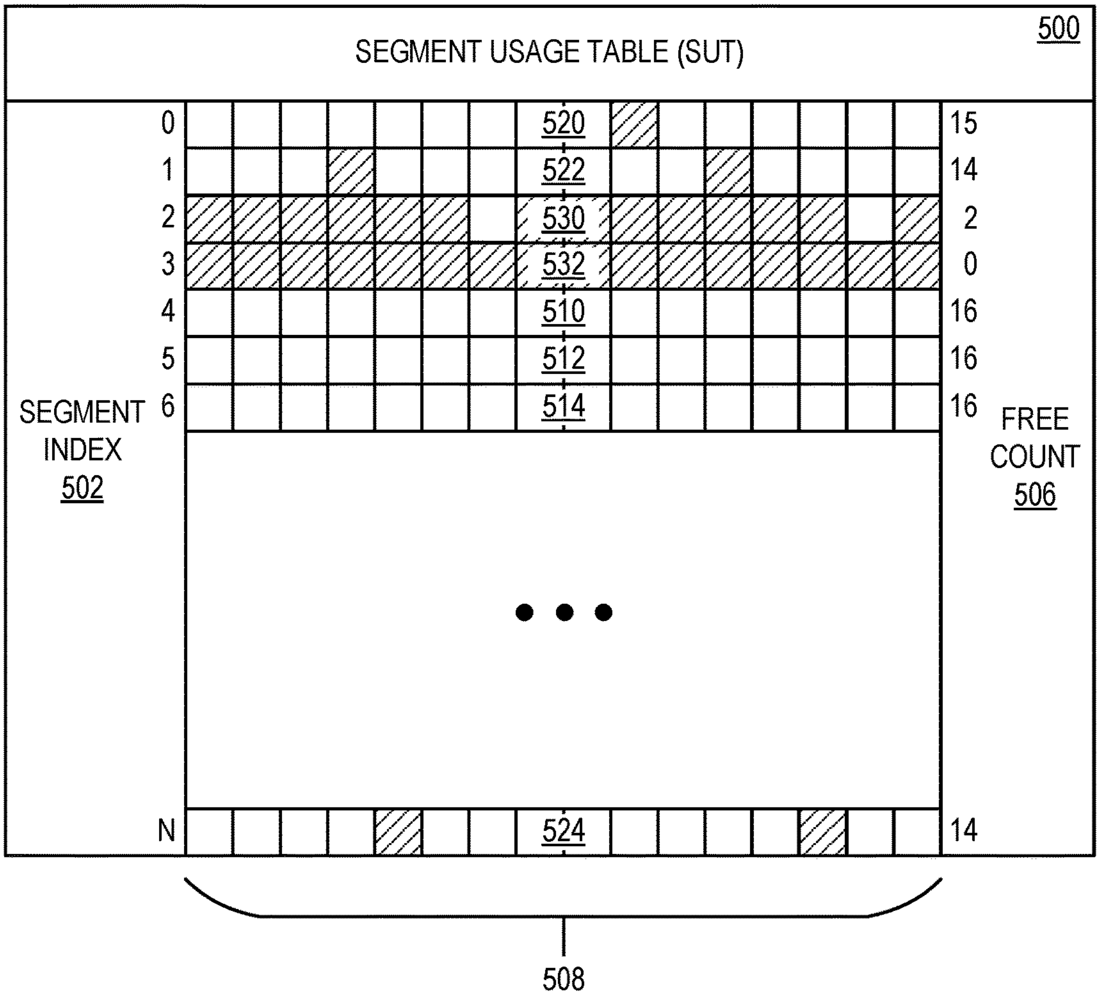

LFS 402 is managed, in part, by SUT 500, which is described in further detail in relation to FIGS. 5A and 5B. FIG. 5A illustrates one version of SUT 500, and an alternative version is illustrated in FIG. 5B. The version illustrated in FIG. 5A may be used, for example, if tiered storage structure 400 uses both hash map 452 and chunk map 454, in which chunk hashes are found in hash map 452, mapped to chunk identifiers, and then the chunk identifiers are used with chunk map 454 to identify the locations in LFS 402. In arrangements in which hash map 452 directly references locations within LFS 402, the version of SUT 500 shown in FIG. 5B may be used.

As illustrated in FIG. 5A, for one version, SUT 500 comprises key-value pairs: a segment index 502 and a live block count 504 indicating the number of live blocks for each segment. In some examples, the total number of blocks in that segment is also indicated. As illustrated in FIG. 5B, for another version, SUT 500 includes a free block count 506 although, in some examples, live block count 504 may instead be used. This version also includes matrix 508, in which blocks with live data (live blocks) are indicated with shading. Non-shaded blocks are either empty or contained old data that has been indicated as deleted. Free block count 506 indicates the number of blocks available for writing. The number of blocks available for writing decrements for the segment being written to, with each write operation.

As illustrated, row 510, row 512, and row 514 are empty (entirely free and available for writing a full segment of data). Row 520, row 522, and row 524 are lightly used, and thus are candidates for segment cleaning (e.g., segment cleaning candidates). Row 530 and row 532 are heavily used and thus are likely not candidates for segment cleaning. In some examples, SUT 500 forms a doubly-linked list. A doubly-linked list is a linked data structure having a set of sequentially linked records.

SUT 500 (either the version of FIG. 5A or the version of FIG. 5B) summarizes the amount of live space left in each log segment and may be used to ascertain which log segments are suitable candidates for segment cleaning (garbage collection). After segments are selected as candidates, they are read into memory, and each block is checked to determine whether CAS 450 still points to its log segment. If so, those blocks are live blocks, and are rewritten to the end of LFS 402 as new segments. CAS 450 is adjusted to point to the new log segments and the old segments may be removed. Removal may be logical, such as dereferencing the segments although, in some examples, physical removal of the actual data does not occur until the media is over-written with new data.

As writing progresses, the current segment (to which the next incoming data will be written) circles around back to the top of SUT 500. Segment cleaning operations prepare for this, by cleaning out lightly used segments and coalescing their blocks into full or more heavily-used segments. If live block count 504 is zero, indicating that a segment contains no live data, that segment may be over-written without moving any blocks. Any prior-written data in that segment has either already been moved or marked as deleted and thus may be over-written without loss of data. Segment cleaning is also useful to support tiering, the movement of older infrequently-accessed data from faster, more expensive storage to less expensive storage.

Figure 6A:
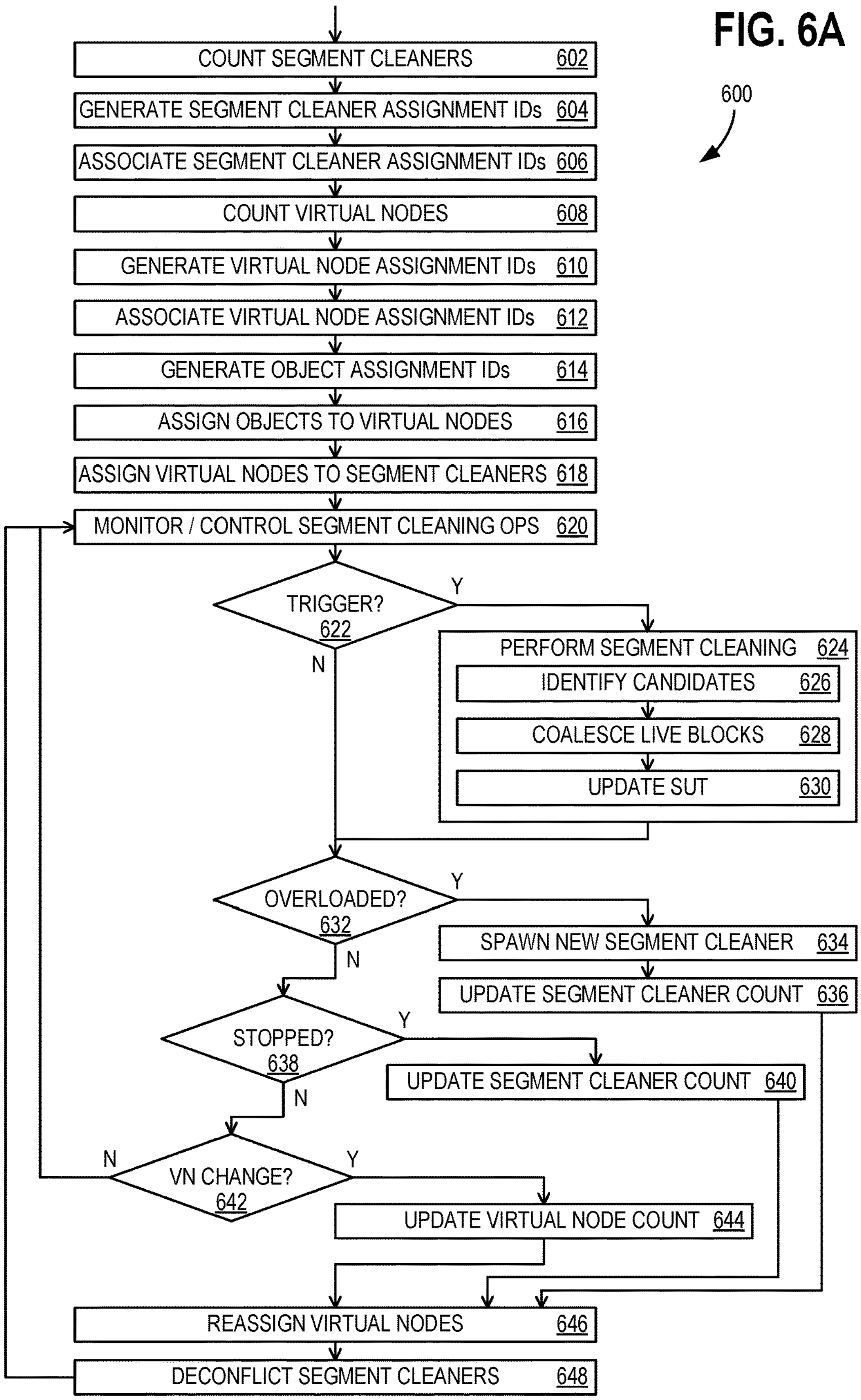
FIG. 6A illustrates a flow chart of exemplary operations associated with the architecture of FIG. 1.

FIG. 6 illustrates a flow chart 600 of exemplary operations associated with segment cleaning in architecture 100, for example, scaling segment cleaning for LFS 402 using SUT 500. In some examples, the operations of flow chart 600 are performed by one or more computing devices 800 of FIG. 8. Operation 602 includes determining, for a plurality of segment cleaners 111-114, a first count of the segment cleaners (initial value of segment cleaner count 160). Multiple segment cleaners are used that operate concurrently. Operation 604 includes generating, for each segment cleaner, a segment cleaner assignment identifier (e.g., segment cleaner assignment identifier S01). In some examples, each segment cleaner is assigned a random value, for example segment cleaner assignment identifier S01 for segment cleaner 111 may be a random value, or segment cleaner identifier SID01 and segment cleaner assignment identifier S01 is a hash value of segment cleaner identifier SID01.

Operation 606 includes associating, with each segment cleaner, a segment cleaner assignment identifier (e.g., associating segment cleaner assignment identifier S01 with segment cleaner 111, segment cleaner assignment identifier S02 with segment cleaner 112, and so on. The spacing of the segment cleaner assignment identifiers should also be distributed evenly. Operation 608 includes determining, for a plurality of virtual nodes 121-125, a first count of the virtual nodes (initial value of virtual node count 162), wherein each virtual node is associated with a plurality of objects (e.g., virtual node 121 is associated with objects 131 and 132, virtual node 122 is associated with objects 133 and 134, and so on).

Operation 610 includes generating, for each virtual node, a virtual node assignment identifier (e.g., virtual node assignment identifier N01). In some examples, generating, for each virtual node, the virtual node assignment identifier comprises hashing an identifier of the virtual node (e.g., virtual node identifier VNID01). In some examples, generating, for each virtual node, the virtual node assignment identifier comprises performing a modulus operation. In some examples, generating, for each virtual node, the virtual node assignment identifier comprises calculating a modulus of a hash value of the virtual node identifier with respect to a maximum segment cleaner assignment identifier. By taking a modulus of a hash value, the virtual node assignment identifiers should be distributed evenly. Operation 612 includes associating, with each virtual node, a virtual node assignment identifier. Notionally, this produces approximately even spacing of computational burdens around circle 200 of FIG. 2, for which there is also even spacing of assets (segment cleaners).

Operation 614 includes generating, for each object, an object assignment identifier. In some examples, generating, for each object, the object assignment identifier comprises performing a modulus operation. In some examples, generating, for each object, an object assignment identifier comprises calculating a modulus of a hash value of the object identifier with respect to a count of the virtual nodes. In some examples, each object represents a VMDK. Operation 616 includes assigning, based at least on the object assignment identifier, each object to a virtual node, for example using assignment component 152 of FIG. 1. In some examples, a count of the objects exceeds the first count of the virtual nodes by at least an order of magnitude. Thus, each of virtual nodes 121-125 may be associated with tens, hundreds, or thousands of objects (e.g., objects 131-140 and more).

Operation 618 includes assigning each virtual node to a selected segment cleaner (e.g., assigning virtual node 121 to segment cleaner 111). Because of the random values (e.g., hash values and modulus operations), the result is a likelihood of a balanced load for segment cleaning. For speed and reduced overhead, enforcement of stringent load balancing is avoided, and the probabilistic nature of the load balancing provides a trade-off. Different segment cleaners operate on different objects concurrently, without conflict. In some examples, the first count of the virtual nodes exceeds the first count of the segment cleaners by at least an order of magnitude. In some examples, assigning each virtual node to a selected segment cleaner comprises, based at least on the segment cleaner assignment identifiers and the virtual node assignment identifiers, assigning each virtual node to a selected segment cleaner. In some examples, assigning each virtual node to the selected segment cleaner comprises load balancing. In some examples, assigning each virtual node to the selected segment cleaner comprises consistent hashing. In some examples, the assignments are stored in a key-value store (assignment pairing 154).

Operation 620 includes monitoring and controlling segment cleaning operations. For example, cleaning manager 150 monitors and controls segment cleaners 111-114. Decision operation 622 includes identifying a segment cleaning trigger condition, such as a time event, a data purge event, or LFS 402 reaching a threshold level of usage. Operation 624 comprises operations 626-630 and includes, based at least on the assignments, performing, for each virtual node, segment cleaning of the plurality of objects by its assigned segment cleaner. For example, segment cleaner 111 performs segment cleaning of LFS 402 for segments that store chunks of objects 131 and 132. To accomplish this, operation 626 includes identifying segment cleaning candidates (e.g., rows 520-524 of FIG. 5), operation 628 includes coalescing live blocks from the segment cleaning candidates, and operation 630 includes updating SUT 500 to reflect the coalescing.

In decision operation 632, cleaning manager 150 determines whether one of segment cleaners 111-114 is overloaded (e.g., overly burdened). That is, for some conditions, decision operation 632 includes determining that at least one of the plurality of segment cleaners is overloaded. If needed, cleaning manager 150 spawns one or more new segment cleaners at operation 634. Operation 636 includes, based at least on determining that at least one of the plurality of segment cleaners is overloaded, increasing the first count of the segment cleaners to the second count of the segment cleaners. That is, segment cleaner count 160 is increased from a first value to a second value.

In some scenarios, one of segment cleaners 111-114 may cease operations, for example due to a crash or other reason for process termination. In such a scenario, decision operation 638 includes determining that at least one of the plurality of segment cleaners has ceased operations and operation 640 includes, based at least on determining that at least one of the plurality of segment cleaners has ceased operations, decreasing the first count of the segment cleaners to the second count of the segment cleaners. That is, segment cleaner count 160 is decreased at 640. In some scenarios, the number of virtual nodes may increase or decrease. In such scenarios, decision operation 642 includes determining a change of the count of the virtual nodes (virtual node count 162). Operation 644 includes, based at least on a change of the first count of the virtual nodes changing to a second count of the virtual nodes.

Figure 6B:
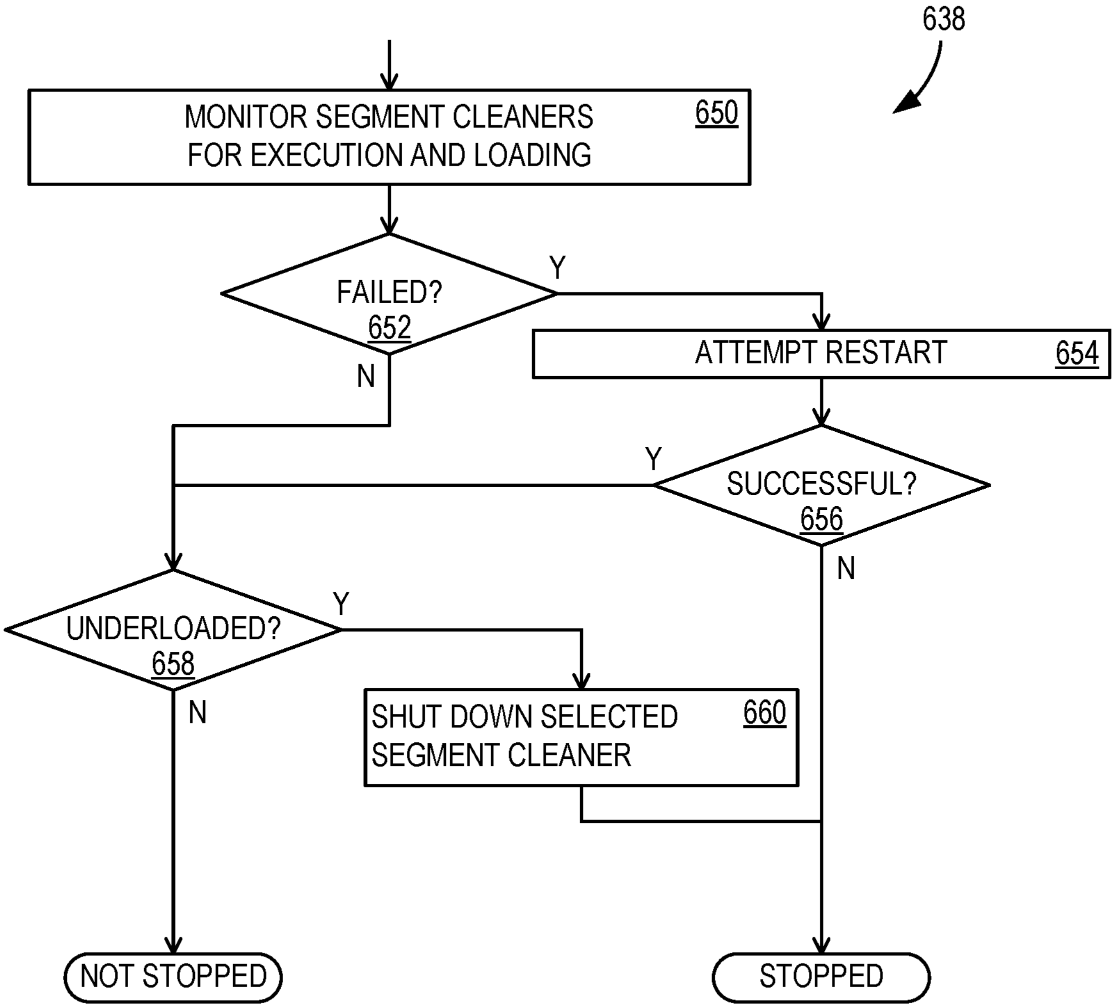
FIG. 6B illustrates additional detail for the flow chart of FIG. 6A.

Turning briefly to FIG. 6B, additional detail for operation 638 is shown. Operation 638 comprises operations 650-660, as illustrated. Operation 650 monitors segment cleaners for execution and loading. When decision operation 652 detects that a segment cleaner has failed, operation 654 includes attempting to restart the failed segment cleaner on either the same node or a different node. The failed segment cleaner will be restarted (maybe on different compute node if necessary) repeatedly until it is restarted (as determined in operation 656). Otherwise, if decision operation 658 detects that a segment cleaner is underloaded, the count of segment cleaners may be reduced. In some examples, the segment cleaner with the highest segment cleaner identifier is shut down first. This selection of the highest may segment cleaner identifier prevent gaps in the segment cleaner identifiers, preserving a scheme of the segment cleaners being consecutively numbered.

In the absence of any changes to segment cleaner count 160 or virtual node count 162, flow chart 600 returns to operation 620. However, in the situation of segment cleaner count 160 changing (increasing or decreasing) or virtual node count 162 changing (increasing or decreasing), a reassignment is performed in operation 646. That is, operation 646 includes for a portion, less than all, of the plurality of virtual nodes, reassigning each virtual node of the portion to a newly selected segment cleaner, based at least on a change of the first count of the segment cleaners changing to a second count of the segment cleaners (operations 636 or 640), or based at least on a change of the first count of the virtual nodes changing to a second count of the virtual nodes (operation 644).

In some examples, reassigning a portion of the plurality of virtual nodes to a newly selected segment cleaner comprises load balancing. In some examples, reassigning a portion of the plurality of virtual nodes to a newly selected segment cleaner comprises consistent hashing. In some examples, the portion approximates a ratio defined by a final count of the virtual nodes divided by a final count of the segment cleaners. In some examples, approximating the ratio comprises matching the ratio within ten percent. In some examples, the reassignments are stored in a key-value store (assignment pairing 154).

Prior to any segment cleaners 111-114 servicing new ones of objects 131-140, the segment cleaner that had been operating on a particular object is stopped. Operation 648 includes deconflicting segment cleaning for previously-assigned segment cleaners and reassigned segment cleaners. This ensures that there is only a single segment cleaner working on any object, avoiding possible race conditions. As flow chart 600 returns to operation 620 and passes through operation 624 again, operation 624 includes, based at least on the reassignments, performing, for each virtual node of the portion, segment cleaning of the plurality of objects by its reassigned segment cleaner.

Figure 7:
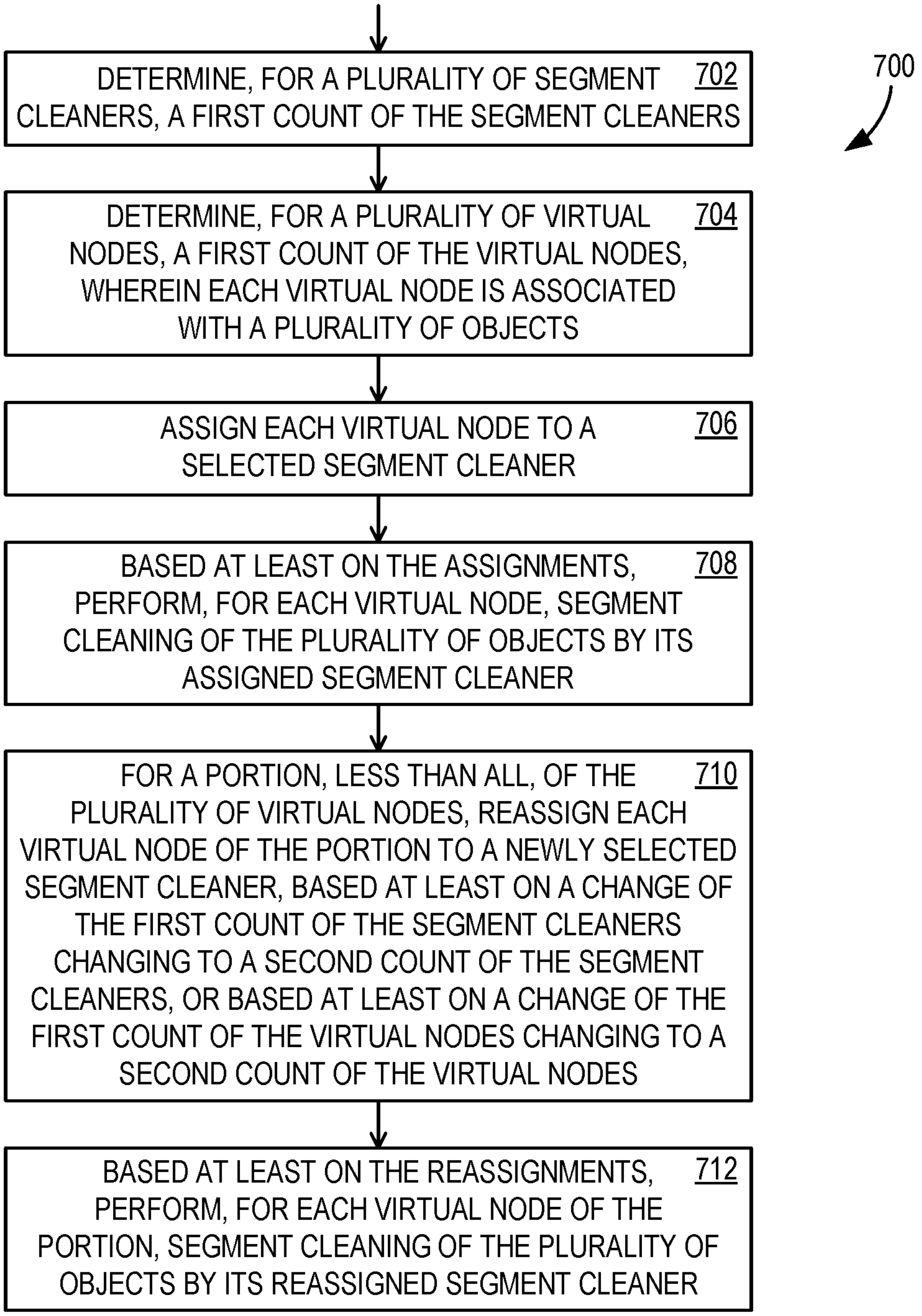
FIG. 7 illustrates another flow chart of exemplary operations associated with the architecture of FIG. 1.

FIG. 7 illustrates a flow chart 700 showing a method of managing archived storage. In some examples, the operations of flow chart 700 are performed by one or more computing devices 800 of FIG. 8. Operation 702 includes determining, for a plurality of segment cleaners, a first count of the segment cleaners. Operation 704 includes determining, for a plurality of virtual nodes, a first count of the virtual nodes, wherein each virtual node is associated with a plurality of objects. Operation 706 includes assigning each virtual node to a selected segment cleaner. Operation 708 includes based at least on the assignments, performing, for each virtual node, segment cleaning of the plurality of objects by its assigned segment cleaner. Operation 710 includes for a portion, less than all, of the plurality of virtual nodes, reassigning each virtual node of the portion to a newly selected segment cleaner, based at least on a change of the first count of the segment cleaners changing to a second count of the segment cleaners, or based at least on a change of the first count of the virtual nodes changing to a second count of the virtual nodes. Operation 712 includes based at least on the reassignments, performing, for each virtual node of the portion, segment cleaning of the plurality of objects by its reassigned segment cleaner.

Figure 8:
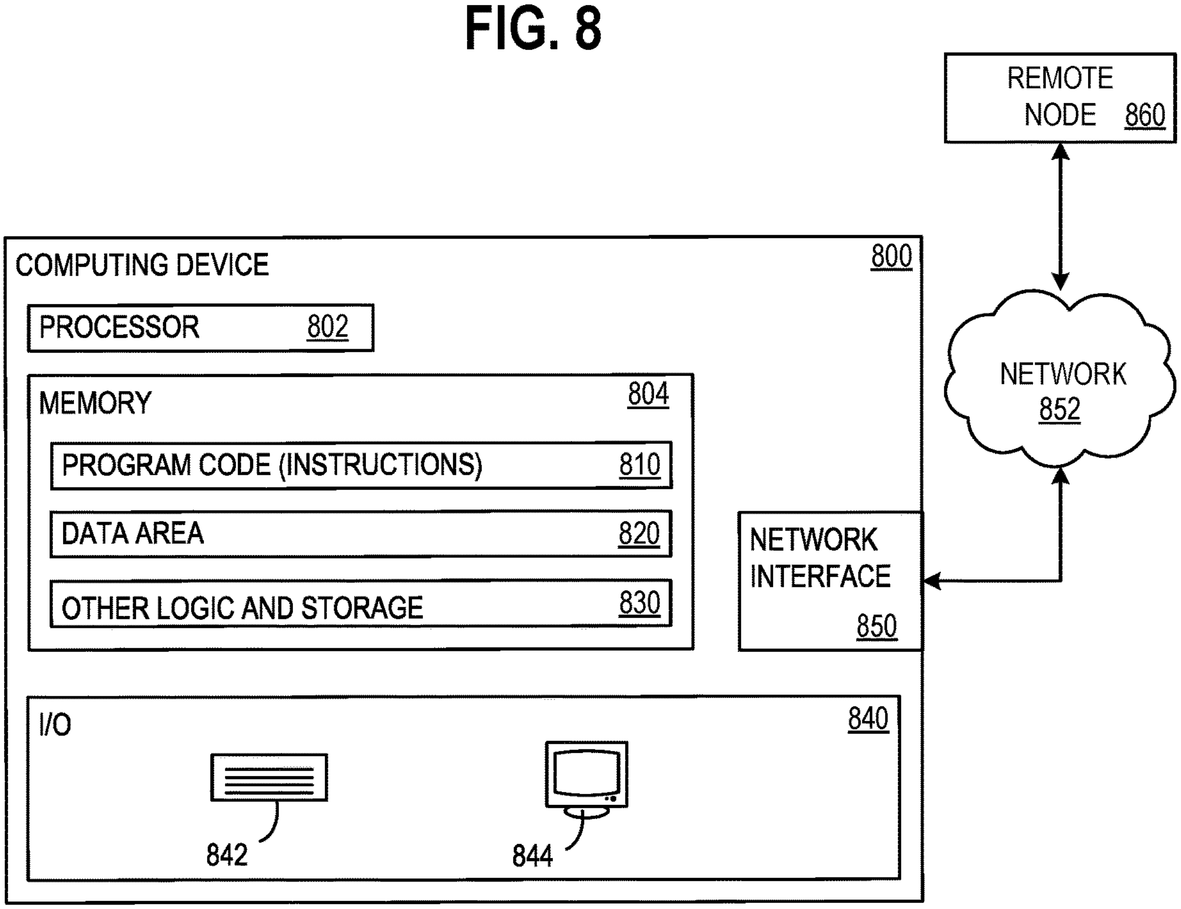
FIG. 8 illustrates a block diagram of a computing device that may be used as a component of the architecture of FIG. 1, according to an example.

FIG. 8 illustrates a block diagram of computing device 800 that may be used within architecture 100 of FIG. 1. Computing device 800 has at least a processor 802 and a memory 804 (or memory area) that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid state drives (SSDs), non-volatile memory express (NVMe) devices, persistent memory (PMEM), quad-level cell (QLC) storage solutions, and/or optical disks. Program code 88 comprises computer executable instructions and computer executable components that embody methods and operations disclosed herein. Other logic and storage 830 that performs or facilitates other functions disclosed herein or otherwise required of computing device 800. A keyboard 842 and a computer monitor 844 are illustrated as exemplary portions of an I/O component 840, which may also or instead include a touchscreen, mouse, trackpad, and/or other I/O devices. A network interface 850 permits communication over a network 852 with a remote node 860, which may represent another implementation of computing device 800 or a cloud service.

Computing device 800 generally represents any device executing instructions (e.g., as application programs, operating system functionality, or both) to implement the operations and functionality described herein. Computing device 800 may include any portable or non-portable device including a mobile telephone, laptop, tablet, computing pad, netbook, gaming device, portable medium player, desktop personal computer, kiosk, embedded device, and/or tabletop device. Additionally, computing device 800 may represent a group of processing units or other computing devices, such as in a cloud computing system or service. Processor 802 may include any quantity of processing units and may be programmed to execute any components of program code 810 comprising computer executable instructions for implementing aspects of the disclosure. In some embodiments, processor 802 is programmed to execute instructions such as those illustrated in the figures.

ADDITIONAL EXAMPLES

An exemplary computer system for managing archived storage comprises: a processor; and a non-transitory computer readable medium having stored thereon program code for transferring data to another computer system, the program code causing the processor to: determine, for a plurality of segment cleaners, a first count of the segment cleaners; determine, for a plurality of virtual nodes, a first count of the virtual nodes, wherein each virtual node is associated with a plurality of objects; assign each virtual node to a selected segment cleaner; based at least on the assignments, perform, for each virtual node, segment cleaning of the plurality of objects by its assigned segment cleaner; for a portion, less than all, of the plurality of virtual nodes, reassign each virtual node of the portion to a newly selected segment cleaner, based at least on a change of the first count of the segment cleaners changing to a second count of the segment cleaners, or based at least on a change of the first count of the virtual nodes changing to a second count of the virtual nodes; and based at least on the reassignments, perform, for each virtual node of the portion, segment cleaning of the plurality of objects by its reassigned segment cleaner.

An exemplary method of segment cleaning comprises: determining, for a plurality of segment cleaners, a first count of the segment cleaners; determining, for a plurality of virtual nodes, a first count of the virtual nodes, wherein each virtual node is associated with a plurality of objects; assigning each virtual node to a selected segment cleaner; based at least on the assignments, performing, for each virtual node, segment cleaning of the plurality of objects by its assigned segment cleaner; for a portion, less than all, of the plurality of virtual nodes, reassigning each virtual node of the portion to a newly selected segment cleaner, based at least on a change of the first count of the segment cleaners changing to a second count of the segment cleaners, or based at least on a change of the first count of the virtual nodes changing to a second count of the virtual nodes; and based at least on the reassignments, performing, for each virtual node of the portion, segment cleaning of the plurality of objects by its reassigned segment cleaner.

An exemplary non-transitory computer readable storage medium has stored thereon program code executable by a first computer system at a first site, the program code embodying a method comprising: determining, for a plurality of segment cleaners, a first count of the segment cleaners;

determining, for a plurality of virtual nodes, a first count of the virtual nodes, wherein each virtual node is associated with a plurality of objects; assigning each virtual node to a selected segment cleaner; based at least on the assignments, performing, for each virtual node, segment cleaning of the plurality of objects by its assigned segment cleaner; for a portion, less than all, of the plurality of virtual nodes, reassigning each virtual node of the portion to a newly selected segment cleaner, based at least on a change of the first count of the segment cleaners changing to a second count of the segment cleaners, or based at least on a change of the first count of the virtual nodes changing to a second count of the virtual nodes; and based at least on the reassignments, performing, for each virtual node of the portion, segment cleaning of the plurality of objects by its reassigned segment cleaner.

Alternatively, or in addition to the other examples described herein, examples include any combination of the following:

- assigning each virtual node to the selected segment cleaner and reassigning a portion of the plurality of virtual nodes to a newly selected segment cleaner comprises consistent hashing;
- assigning each virtual node to the selected segment cleaner and reassigning a portion of the plurality of virtual nodes to a newly selected segment cleaner comprises load balancing;
- the portion approximates a ratio defined by a final count of the virtual nodes divided by a final count of the segment cleaners;
- determining that at least one of the plurality of segment cleaners is overloaded;
- based at least on determining that at least one of the plurality of segment cleaners is overloaded, increasing the first count of the segment cleaners to the second count of the segment cleaners;
- determining that at least one of the plurality of segment cleaners has ceased operations;
- based at least on determining that at least one of the plurality of segment cleaners has ceased operations, decreasing the first count of the segment cleaners to the second count of the segment cleaners;
- generating, for each virtual node, a virtual node assignment identifier;
- generating, for each virtual node, the virtual node assignment identifier comprises hashing an identifier of the virtual node;
- generating, for each virtual node, the virtual node assignment identifier comprises performing a modulus operation;
- generating, for each virtual node, the virtual node assignment identifier comprises calculating a modulus of a hash value of the virtual node identifier with respect to a maximum segment cleaner assignment identifier;
- deconflicting segment cleaning for previously-assigned segment cleaners and reassigned segment cleaners;
- the segment cleaning comprises segment cleaning of an LFS;
- associating, with each segment cleaner, a segment cleaner assignment identifier;
- associating, with each virtual node, a virtual node assignment identifier;
- assigning each virtual node to a selected segment cleaner comprises, based at least on the segment cleaner assignment identifiers and the virtual node assignment identifiers, assigning each virtual node to a selected segment cleaner;
- the segment cleaning uses a SUT;
- identifying segment cleaning candidates;
- coalescing live blocks from the segment cleaning candidates;
- updating the SUT to reflect the coalescing;
- approximating the ratio comprises matching the ratio within ten percent;
- the assignments and the reassignments are stored in a key-value store;
- each object represents a VMDK;
- the first count of the virtual nodes exceeds the first count of the segment cleaners by at least an order of magnitude;
- a count of the objects exceeds the first count of the virtual nodes by at least an order of magnitude;
- generating, for each object, an object assignment identifier;
- generating, for each object, the object assignment identifier comprises performing a modulus operation; and
- generating, for each object, an object assignment identifier comprises calculating a modulus of a hash value of the object identifier with respect to a count of the virtual nodes.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of segment cleaning, the method comprising:
- determining, for a plurality of segment cleaners, a first count of the segment cleaners;
- determining, for a plurality of virtual nodes, a first count of the virtual nodes, wherein each virtual node is associated with a plurality of objects;
- assigning each virtual node of the plurality of virtual nodes to a selected segment cleaner;
- for a portion, less than all, of the plurality of virtual nodes, reassigning each virtual node of the portion to a newly selected segment cleaner, based on at least one of the following: the first count of the segment cleaners changing to a second count of the segment cleaners, and the first count of the virtual nodes changing to a second count of the virtual nodes;
- determining that at least one of the segment cleaners has ceased operations;
- based at least on determining that at least one of the segment cleaners has ceased operations, for another portion of the plurality of virtual nodes that are assigned to the at least one of the segment cleaners, reassigning each virtual node of the another portion to an operating segment cleaner of the segment cleaners; and
- based at least on the reassignment of the portion and the reassignment of the another portion, performing, for each virtual node of the portion and the reassigned another portion, segment cleaning of the plurality of objects.

2. The method of claim 1, wherein the plurality of objects comprises virtual machine disks.

3. The method of claim 1, wherein the reassigning of the portion comprises reassigning, using consistent hashing, each virtual node of the portion of the plurality of virtual nodes to the newly selected segment cleaner.

4. The method of claim 1, wherein based on the reassignment of the portion, each segment cleaner of the plurality of segment cleaners services approximately a same quantity of the virtual nodes.

5. The method of claim 1, further comprising:
- determining that at least one of the plurality of segment cleaners is overloaded; and
- based at least on determining that at least one of the plurality of segment cleaners is overloaded, increasing the first count of the segment cleaners to a second count of the segment cleaners.

6. The method of claim 1, wherein the plurality of objects comprises snapshots of virtual machine disks, and each of the snapshots comprises a version of a versioned object.

7. The method of claim 1, further comprising:

generating, for each virtual node, a virtual node assignment identifier, wherein generating the virtual node assignment identifier comprises hashing an identifier of the virtual node.

8. A computer system for segment cleaning, the computer system comprising:

a processor; and a non-transitory computer readable medium having stored thereon program code that upon execution causes the processor to:

determine, for a plurality of segment cleaners, a first count of the segment cleaners;

determine, for a plurality of virtual nodes, a first count of the virtual nodes, wherein each virtual node is associated with a plurality of objects;

assign each virtual node of the plurality of virtual nodes to a selected segment cleaner;

for a portion, less than all, of the plurality of virtual nodes, reassign each virtual node of the portion to a newly selected segment cleaner, based on at least one of the following: the first count of the segment cleaners changing to a second count of the segment cleaners, and the first count of the virtual nodes changing to a second count of the virtual nodes;

determine that at least one of the segment cleaners has ceased operations;

based at least on determining that at least one of the segment cleaners has ceased operations, for another portion of the plurality of virtual nodes that are assigned to the at least one of the segment cleaners, reassign each virtual node of the another portion to an operating segment cleaner of the segment cleaners; and based at least on the reassignment of the portion and the reassignment of the another portion, perform, for each virtual node of the portion and the reassigned another portion, segment cleaning of the plurality of objects.

9. The computer system of claim 8, wherein the plurality of objects comprises virtual machine disks.

10. The computer system of claim 8, wherein the reassigning of the portion comprises reassigning, using consistent hashing, each virtual node of the portion of the plurality of virtual nodes to the newly selected segment cleaner.

11. The computer system of claim 8, wherein based on the reassignment of the portion, each segment cleaner of the plurality of segment cleaners services approximately a same quantity of the virtual nodes.

12. The computer system of claim 8, wherein the program code is further operative to:

determine that at least one of the plurality of segment cleaners is overloaded; and based at least on determining that at least one of the plurality of segment cleaners is overloaded, increase the first count of the segment cleaners to a second count of the segment cleaners.

13. The computer system of claim 8, wherein the plurality of objects comprises snapshots of virtual machine disks, and each of the snapshots comprises a version of a versioned object.

14. The computer system of claim 8, wherein the program code is further operative to:

generate, for each virtual node, a virtual node assignment identifier, wherein generating the virtual node assignment identifier comprises hashing an identifier of the virtual node.

15. A non-transitory computer readable storage medium having stored thereon program code executable by a processor, the program code embodying a method comprising:

determining, for a plurality of segment cleaners, a first count of the segment cleaners;

determining, for a plurality of virtual nodes, a first count of the virtual nodes, wherein each virtual node is associated with a plurality of objects;

assigning each virtual node of the plurality of virtual nodes to a selected segment cleaner;

for a portion, less than all, of the plurality of virtual nodes, reassigning each virtual node of the portion to a newly selected segment cleaner of the reassigned another portion of the plurality of segment cleaners, based on at least one of the following: the first count of the segment cleaners changing to a second count of the segment cleaners, and the first count of the virtual nodes changing to a second count of the virtual nodes;

determining that at least one of the segment cleaners has ceased operations;

based at least on determining that at least one of the segment cleaners has ceased operations, for another portion of the plurality of virtual nodes that are assigned to the at least one of the segment cleaners, reassigning each virtual node of the another portion to an operating segment cleaner of the segment cleaners; and based at least on the reassignment of the portion and the reassignment of the another portion, performing, for each virtual node of the portion and the reassigned another portion, segment cleaning of the plurality of objects.

16. The non-transitory computer readable storage medium of claim 15, wherein the plurality of objects comprises virtual machine disks.

17. The non-transitory computer readable storage medium of claim 15, wherein the reassigning of the portion comprises reassigning, using consistent hashing, each virtual node of the portion of the plurality of virtual nodes to the newly selected segment cleaner.

18. The non-transitory computer readable storage medium of claim 15, wherein based on the reassignment of the portion, each segment cleaner of the plurality of segment cleaners services approximately a same quantity of the virtual nodes.

19. The non-transitory computer readable storage medium of claim 15, wherein the program code further comprises:

determining that at least one of the plurality of segment cleaners is overloaded; and based at least on determining that at least one of the plurality of segment cleaners is overloaded, increasing the first count of the segment cleaners to a second count of the segment cleaners.

20. The non-transitory computer readable storage medium of claim 15, wherein the plurality of objects comprises snapshots of virtual machine disks, and each of the snapshots comprises a version of a versioned object.

* * * * *